United States Patent [19]

Brown et al.

[11] Patent Number: 4,488,243

[45] Date of Patent: Dec. 11, 1984

[54] DYNAMIC TIME WARPING ARRANGEMENT

[75] Inventors: Michael K. Brown, Piscataway; Lawrence R. Rabiner, Berkeley Heights, both of N.J.

[73] Assignee: AT&T Bell Laboratories, Murray Hill, N.J.

[21] Appl. No.: 374,307

[22] Filed: May 3, 1982

[51] Int. Cl.[3] .................... G10L 1/00

[52] U.S. Cl. .................... 364/513.5; 381/43

[58] Field of Search .................... 364/513.5; 381/41-43; 382/33, 34, 37

[56] References Cited

U.S. PATENT DOCUMENTS

| | | | |
|---|---|---|---|
| 3,816,722 | 6/1974 | Sakoe et al. | 235/152 |
| 4,256,924 | 3/1981 | Sakoe | 381/43 |

OTHER PUBLICATIONS

"Speech Recognition by Computer", S. E. Levinson et al., Scientific American, vol. 244, No. 4, Apr. 1981, pp. 64–76.

"Speaker-Independent Recognition of Isolated Words Using Clustering Techniques", L. R. Rabiner et al., IEEE Transactions on Acoustics, Speech, and Signal Processing, vol. ASSP-27, No. 4, Aug. 1979, pp. 336–349.

"Performance Tradeoffs in Dynamic Time Warping Algorithms for Isolated Word Recognition", C. Myers et al., IEEE Transactions on Acoustics, Speech, and Signal Processing, vol. ASSP-28, No. 6, Dec. 1980, pp. 623–635.

"Minimum Prediction Residual Principle Applied to Speech Recognition", F. Itakura, IEEE Transactions on Acoustics, Speech, and Signal Processing, vol. ASSP-23, No. 1, Feb. 1975, pp. 67–72.

"State-Space Search Methods", Problem-Solving Methods in Artificial Intelligence, McGraw-Hill, 1971, N. J. Nilsson, pp. 43–77.

"The Harpy Speech Understanding System", B. Lowerre et al., Prentice-Hall, Inc., Trends in Speech Recognition, 1980, Chapt. 15, pp. 340–360.

*Primary Examiner*—E. S. Matt Kemeny

*Attorney, Agent, or Firm*—Kurt C. Olsen

[57] ABSTRACT

In a speech recognition system, dynamic time warp (DTW) calculations are reduced by use of a search strategy for an optimal non-linear search warp function path: signals predictive of the similarity are generated responsive to the preceding and current correspondence signals of the input word to reference warped words.

22 Claims, 6 Drawing Figures

DYNAMIC TIME WARPING ARRANGEMENT

BACKGROUND OF THE INVENTION

Our invention relates to speech analysis and, more particularly, to dynamic time warping arrangements for speech pattern recognition.

Speech recognizers permit direct input to communication, data processing and control systems. A recognizer typically has a reference vocabulary stored digitally as acoustic patterns called templates. An input utterance is converted to digital form and compared to the reference templates. The most similar template is selected as the identity of the input. An overview of automatic recognition may be found in the article by S. E. Levinson and M. Y. Liberman entitled, "Speech Recognition by Computer", *Scientific American,* April 1981, Vol. 244, No. 4, pages 64–76.

In order to compare an input pattern, e.g. a spoken word, with a reference, each word is divided into a sequence of time frames. In each time frame, signals representative of acoustic features of the speech pattern are obtained. For each frame of the input word, a frame of the reference word is selected. Signals representative of the similarity or correspondence between each selected pair of frames are obtained responsive to the acoustic feature signals. The correspondence signals for the sequence of input and reference word frame pairs are used to obtain a signal representative of the global or overall similarity between the input word and a reference word template.

Since there are many different ways of pronouncing the same word, the displacement in time of the acoustic features comprising the word is variable. Different utterances of the same word, even by the same individual, may be widely out of time alignment. The selection of frame pairs is therefore not necessarily linear. Matching, for example, the fourth, fifth and sixth frames of the input utterance with the fourth, fifth and sixth frames respectively of the reference word may distort the similarity measure and produce unacceptable errors.

Dynamic time warping arrangements have been developed which align the frames of a test and reference pattern in an efficient or optimal manner. The alignment is optimal in that the global similarity measure assumes an extremum. It may be, for example, that the fifth frame of the test word should be paired with the sixth frame of the reference word to obtain the best similarity measure.

In U.S. Pat. No. 3,816,722 (Sakoe et al), feature signals are obtained for the frames of input and reference words. Local correspondence signals are generated between all possible pairs of input and reference word frames within a given range or window. An extremum path of local correspondence signals is selected by a dynamic programming recursive process. The generation of all local correspondence signals within a given window, however, may be burdensome. In a simple microprocessor system, for example, the Sakoe process is comparatively slow.

It is thus an object of the invention to provide an improved arrangement for time alignment of speech patterns which abates local correspondence signal generation.

SUMMARY OF THE INVENTION

The invention is directed to an arrangement for time aligning a first speech pattern with a second speech pattern. A time frame sequence of acoustic feature signals is generated for each speech pattern. For each successive first speech pattern time frame signal, a set of signals corresponding to second speech pattern candidate time frames is generated. A set of signals representative of the correspondence between the acoustic features of the current first speech pattern time frame and the acoustic feature signals of the second speech pattern candidate time frames is obtained. Responsive to the correspondence signals of the preceding and current first speech pattern time frames, a signal for each second speech pattern candidate time frame and the current first speech pattern time frame is generated which is predictive of the similarity of the first and second speech patterns along a path including the second speech pattern time frame and current first speech pattern time frame. Responsive to the predictive signals of the current first speech pattern time frame, one of the second speech pattern candidate time frames is selected for the current first speech pattern time frame pair.

DETAILED DESCRIPTION

Figure 1:
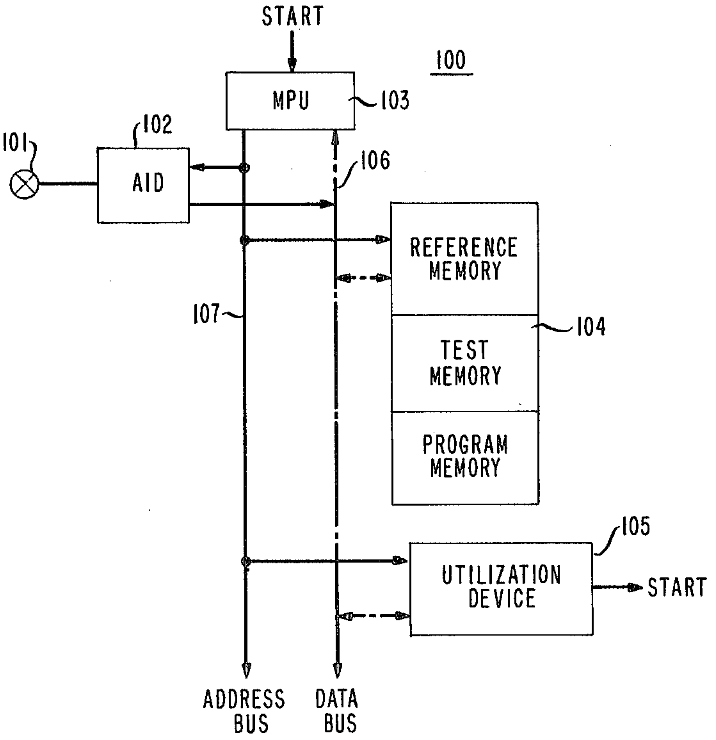
FIG. 1 shows a microcomputer speech recognition circuit illustrative of the invention.

FIG. 1 shows a general block diagram of a microcomputer speech recognizer adapted to perform the digital signal processing functions of the invention. The system of FIG. 1 may be used to identify a spoken utterance. Alternatively, the word recognition arrangement may be implemented with special purpose digital hardware, as is well known in the art.

Referring to FIG. 1, microcomputer 100 comprises input device 101, A/D (analog-to-digital) converter 102, microprocessor 103, memory 104 and utilization device 105. Data bus 106 interconnects the data terminals of converter 102, microprocessor 103, memory 104 and utilization device 105. Address bus 107 likewise interconnects the respective address terminals.

Converter 102 may be, for example, a type TDC1010J integrated circuit made by TRW, Incorporated, La Jolla, Calif. Microprocessor 103 may be, for example, a type 8086 integrated circuit made by Intel Corporation, Santa Clara, Calif. Memory 104 may be, for example, type 2118 integrated circuits made by Intel Corporation. Input device 101 may be, for example, microphone, telephone, voice storage or other communication equipment.

Utilization device 105 may be, for example, a speaker verification system or a spoken word recognizer. A spoken word recognizer is described in detail in the article by L. R. Rabiner, S. E. Levinson, A. E. Rosenberg and J. G. Wilpon entitled, "Speaker Independent Recognition of Isolated Words Using Clustering Techniques", *IEEE Transactions On Acoustics, Speech, and*

*Signal Processing*, Vol. ASSP-27, No. 4, pages 336–349, August 1979.

Figure 2:
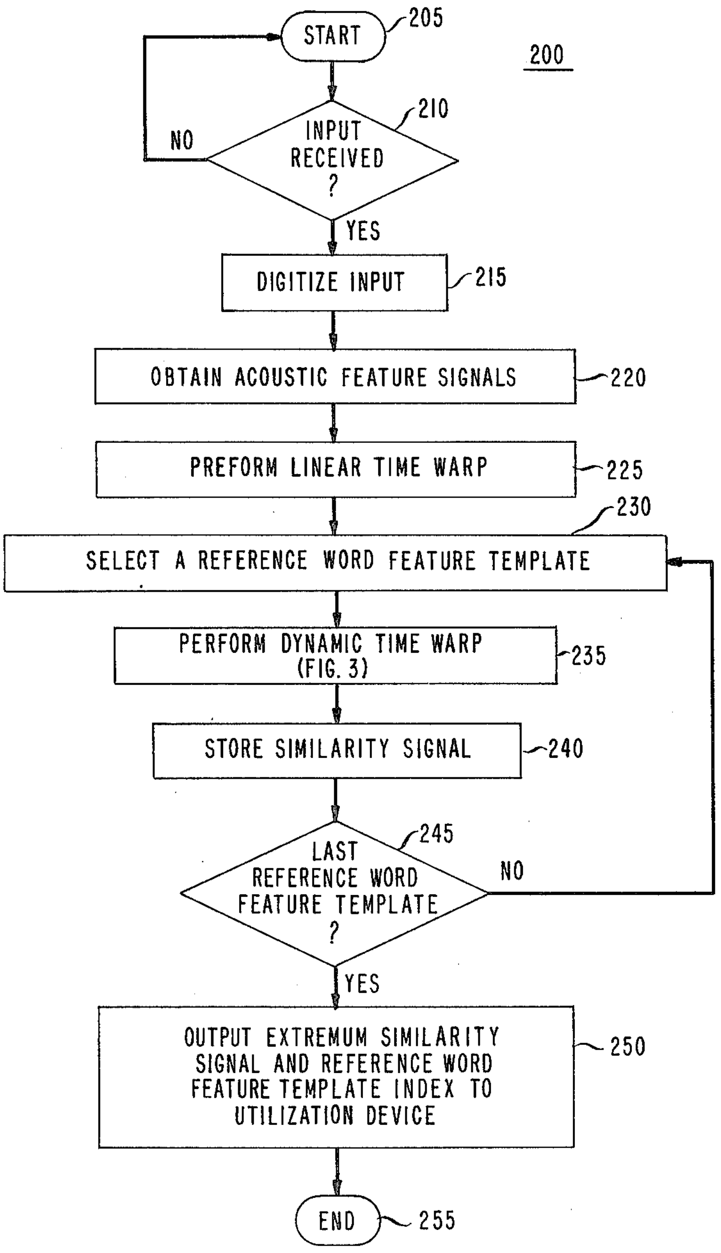
FIG. 2 shows a flow chart of the overall operation of the circuit in FIG. 1.

Referring to FIG. 2, flow chart 200 shows operation and decision boxes representative of processes run by microprocessor 100. Responsive to signal START from utilization device 105, microprocessor 103 is conditioned to begin signal processing operations (box 205 in FIG. 2). An analog speech waveform from input device 101 is applied to the input of converter 102 (box 210). In converter 102, the waveform is digitized (box 215). The digitized input signal is thereby available to microprocessor 103. Responsive to the digitized input signals, microprocessor 103 obtains signals T(n) representative of the acoustic features of the input waveform (box 220). Index n specifies a particular frame of the input word, where each frame represents, for example, 45 msec of speech and adjacent frames are spaced 15 msec apart. Acoustic feature signals T(n) may be obtained on the basis of linear prediction analysis, well known in the art. Alternatively, spectral, formant derived, or other feature signals may be used. Feature signals T(n) are then normalized and linearly warped to a standard duration of, for example, N=21 time frames by microprocessor 103 (box 225). The index n therefore ranges from n=1, 2, . . . , N. Normalization and linear time warp methods of signal processing are further described in the article by C. S. Myers, L. R. Rabiner and A. E. Rosenberg entitled, "Performance Trade Offs In Dynamic Time Warping Algorithm For Isolated Word Recognition", *IEEE Transactions On Acoustic, Speech, and Signal Processing*, Vol. ASSP-28, pages 623–635, December 1980.

Normalized and linearly warped input feature signals T(n) are stored in memory 104. Previously obtained feature template signals $R_v(m)$ for reference words are also stored in memory 104. Subscript v of $R_v(m)$ specifies a particular reference word in a vocabulary having a total of V reference words; the range v=1, 2, . . . , V. Index m specifies a particular frame of a reference word, where the reference word frames have the same duration and spacing as the input word frames (45 and 15 msec).

Following the linear time warping operations (box 225), microprocessor 103 selects one of the reference words v for comparison with the input word (box 230). The comparison is performed by dynamic time warping signal processing in accordance with the invention (box 235). The resultant similarity signal $D_v$ is stored in memory 104 (box 240). Similarity signals $D_v$ are likewise obtained and stored for the other reference words. After the last similarity signal has been generated (box 245), the extremum similarity signal is selected in microprocessor 103 and output to utilization device 105 (box 250). The corresponding reference word index v is also supplied to device 105 as the identity of the input word. Processing for a particular input word is thereby finished (box 255).

The dynamic time warp signal processing of the invention (box 235) is conveniently illustrated with reference to graph 600 in FIG. 6. Graph 600 has a grid of points or nodes. The sequence of test frames n is mapped to the abscissa (the independent variable) and the sequence of reference frames m is mapped to the ordinate (the dependent variable). Each node represents the similarity or correspondence between the $n^{th}$ frame feature signals T(n) of the input word and the $m^{th}$ frame feature signals $R_v(m)$ of the reference word. This correspondence signal may be obtained according to the Itakura log likelihood ratio, as described in the article by F. Itakura entitled, "Minimum Prediction Residual Principle Applied to Speech Recognition", *IEEE Transaction on Acoustics, Speech, and Signal Processing*, Vol. ASSP-23, No. 1, pages 67–72, February, 1975:

$$\tilde{d}(T(n),R_v(m))=\log\,[T(n)\cdot R_v(m)] \tag{1}$$

i.e., a log of the dot product of the two vectors T(n) and $R_v(m)$.

The correspondence signal $\tilde{d}$ is conventionally called the local distance because the magnitude of $\tilde{d}$ increases as the correspondence between T(n) and R(m) decreases. It is to be understood, however, that other measures of similarity may be used, such as correlation coefficients which increase as the correspondence between T(n) and R(m) increases.

Since input frame index n was defined to be the independent variable, the reference frame index m may be written equivalently as a function of n:

$$m=w(n) \tag{2}$$

This orientation has been found to give good performance in word recognition systems. The local distance signal in equation (1) may therefore be written as $\tilde{d}(T(n), R_v(n)))$. The converse orientation is also possible.

In order to optimally align the input frames n with the reference frames m, the sum of the local distance signals $d(T(n)), R_v(w(n)))$ between an input word and a reference word v are minimized:

$$D_v = \min_{w(n)} \frac{1}{N} \sum_{n=1}^{N} \tilde{d}(T(n), R_v(w(n))) \tag{3}$$

Signal $D_v$ is called the total or global average distance signal for reference word v. It will be recalled that the reference word index v=1, 2 . . . V which corresponds to the minimum global distance signal is passed to utilization device 105 as the best candidate for identifying the input word. Alternatively, it may be useful to provide an ordered list of global distance signals to device 105.

In order to obtain a global average distance signal $D_v$, it would be possible to generate a local distance signal $\tilde{d}$ for every node in graph 600. The particular sequence of nodes or "path" which yields the minimum global distance signal could then be found. Such an exhaustive search, however, would not only be inefficient, it may also yield an acoustically unrealistic path. It is therefore desirable to impose certain constraints on the path.

It is assumed that the beginning and ending frames of both the input and reference words have been accurately determined. The first input frame n=1 is thus paired with the first reference frame m=1 or:

$$w(1)=1 \tag{4}$$

Similarly, the last input frame n=N is paired with the last reference frame m=M:

$$w(N)=M \tag{5}$$

It is also assumed that the Itakura path constraints are obeyed:

$$0 \leqq w(n)-w(n-1) \leqq 2 \tag{6}$$

$$w(n)=w(n-1)\neq 0 \text{ if } w(n-1)-w(n-2)=0 \quad (7)$$

These local path constraints guarantee that the average slope of the warping function w(n) lies between ½ and 2 and that the path is monotonic non-decreasing. In other words, the local path constraints define acoustically possible paths.

The preceding endpoint and local path constraints may be summarized by a set of global path constraints:

$$m_L(n)\leqq m\leqq m_H(n) \quad (8)$$

where $$m_L(n)=\min[2(n-1)+1, M-\tfrac{1}{2}(N-n), M] \quad (9)$$

$$m_H(n)=\max[\tfrac{1}{2}(n-1)+1, M-2(N-n), 1] \quad (10)$$

Figure 6:
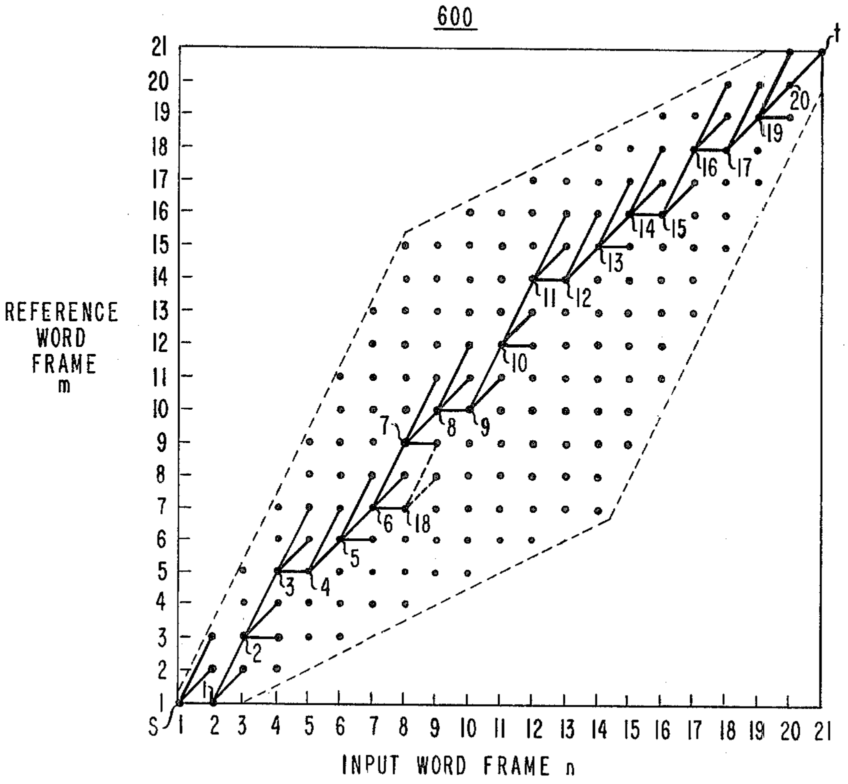
FIG. 6 shows a graph illustrating the operation sequence of the invention.

The global path constraints define the parralelogram or window shown on graph 600 of FIG. 6. Allowable paths include only nodes within the window.

According to the prior art, the minimum path can be found by a dynamic programming process. An accumulated distance signal $D_A$ at any given pair of frames n and m is defined to be the sum of the local distance signals $\bar{d}$ from node (1,1) to and including the present node (n,m), along the minimum distance or "best" path between nodes (1,1) and (n,m). Accumulated distance signal $D_A$ may be generated recursively from node (1,1) to node (N,M) according to the following equation:

$$D_A(n,m)=\bar{d}(T(n),R(m))+\min[D_A(n-1,m)g(n-1,m), D_A(n-1,m-1), D_A(n-1,m-2)] \quad (11)$$

where the constraints are $$1\leqq n\leqq N, m_L(n)\leqq m\leqq m_H(n) \quad (12)$$

and where g(n,m) is the nonlinear weighting $$g(n,m) = 1 \text{ if } w(n) \neq w(n-1) \quad (13)$$
$$\qquad\quad \infty \text{ if } w(n) = w(n-1)$$

to guarantee that the optimum path to (n,m) does not stay flat for two consecutive frames. The desired global distance signal $D_v$ for a reference word v is thereby equal to the accumulated distance signal $D_A(N,M)$.

The preceding dynamic time warping process requires the generation of a local distance signal at every node within the window in graph 600. Local distance signal generation, however, is comparatively slow in a simple microprocessor. According to the invention, therefore, local distance signals are generated only at nodes which are likely candidates for the minimum path.

Referring to graph 600, the $i^{th}$ node is designated by its coordinates n and m:

$$i=(n,m) \quad (14)$$

The starting node s is defined as s=(1,1) and the ending or terminal node t is defined as t=(N,M). In the present example, N=M=21.

An accumulated distance signal g(i) is defined as the sum of the local distance signals $\bar{d}$ along the best path from starting node s to and including node i. The best path comprises the sequence of nodes preceding node i which has the minimum total distance.

A second accumulated distance signal h(i) is defined as the sum of the local distance signals $\bar{d}$ along the best path from node i to ending node t. Beginning at node s=(1,1) and proceeding from left to right on graph 600, signal g(i) may be known exactly at any node i. Signal h(i), on the other hand, is not known and therefore must be estimated or predicted. The predictor of h(i) is designated $\hat{h}(i)$.

From accumulated distance signal g(i) and predictor signal $\hat{h}(i)$, a predicted total distance signal $\hat{f}(i)$ may be found according to equation (15):

$$\hat{f}(i)=g(i)+\hat{h}(i) \text{ tm } (15)$$

Signal $\hat{f}(i)$ represents the predicted total distance of a path from node s to node t which passes through node i.

Before describing how predictor $\hat{h}(i)$ is itself generated, the use of $\hat{h}(i)$ in accordance with the invention to generate local distance signals only at likely candidate nodes is detailed immediately below.

The nodal state at any node i is defined to include: the predictor signal $\hat{h}(i)$, the accumulated distance signal g(i), and a pointer signal (address) to the previous or "parent" node on the path. The path from start node s to any intermediate node i is thus completely characterized by the nodal state of node i and its predecessor nodes.

In searching for the minimum distance path through graph 600, generally nodes from several possible paths are encountered. The nodal state of the last node on each of the possible paths is entered on an "open list". The entries are sorted so that the nodal state of the last node of the path which has the lowest total distance $\hat{f}(i)$ is at the top of the list. The top nodal state is then removed from the open list and entered at the top of a "closed list". The top nodal state from the closed list is "expanded", that is, all permissible successor nodes are selected. New total distance $\hat{f}(i)$ are generated for each successor node. The nodal state information for each successor node is sorted into the open list and the process repeats until the terminal node t is identified. The distance g(t) at node t becomes minimum distance signal $D_v$.

Figure 3:
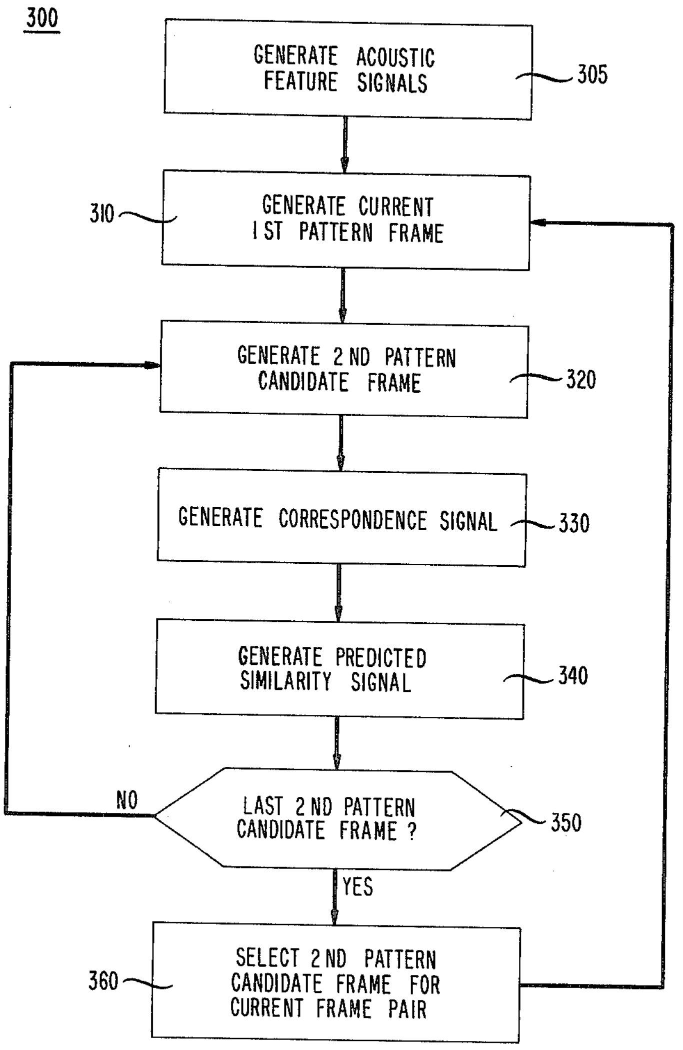
FIG. 3 shows a flow chart illustrative of the invention.

The preceding search process may be summarized in accordance with the invention as illustrated by flow chart 300 in FIG. 3. Acoustic feature signals are generated for first and second speech patterns (box 305). The first and second speech patterns may correspond to, for example, a test word and a reference word, respectively. A current first speech pattern time frame is generated (box 310). A second speech pattern candidate time frame is generated for the current first speech pattern time frame (box 320). Correspondence signals are generated between the acoustic feature signals of the current first speech pattern time frame and the acoustic feature signals of the second speech pattern candidate time frame (box 330). A predicted similarity signal is generated for a path which includes the second speech pattern candidate time frame and the current first speech pattern time frame (box 340). The generation of correspondence and predictor signals (boxes 320, 330 and 340) is repeated for each second speech pattern candidate time frame and the current first speech pattern time frame (box 350). One of the second speech pattern candidate time frames is then selected for the current first speech pattern time frame pair (box 360). The operations (boxes 310–360) are repeated for each successive first speech pattern time frame signal.

Figure 4:
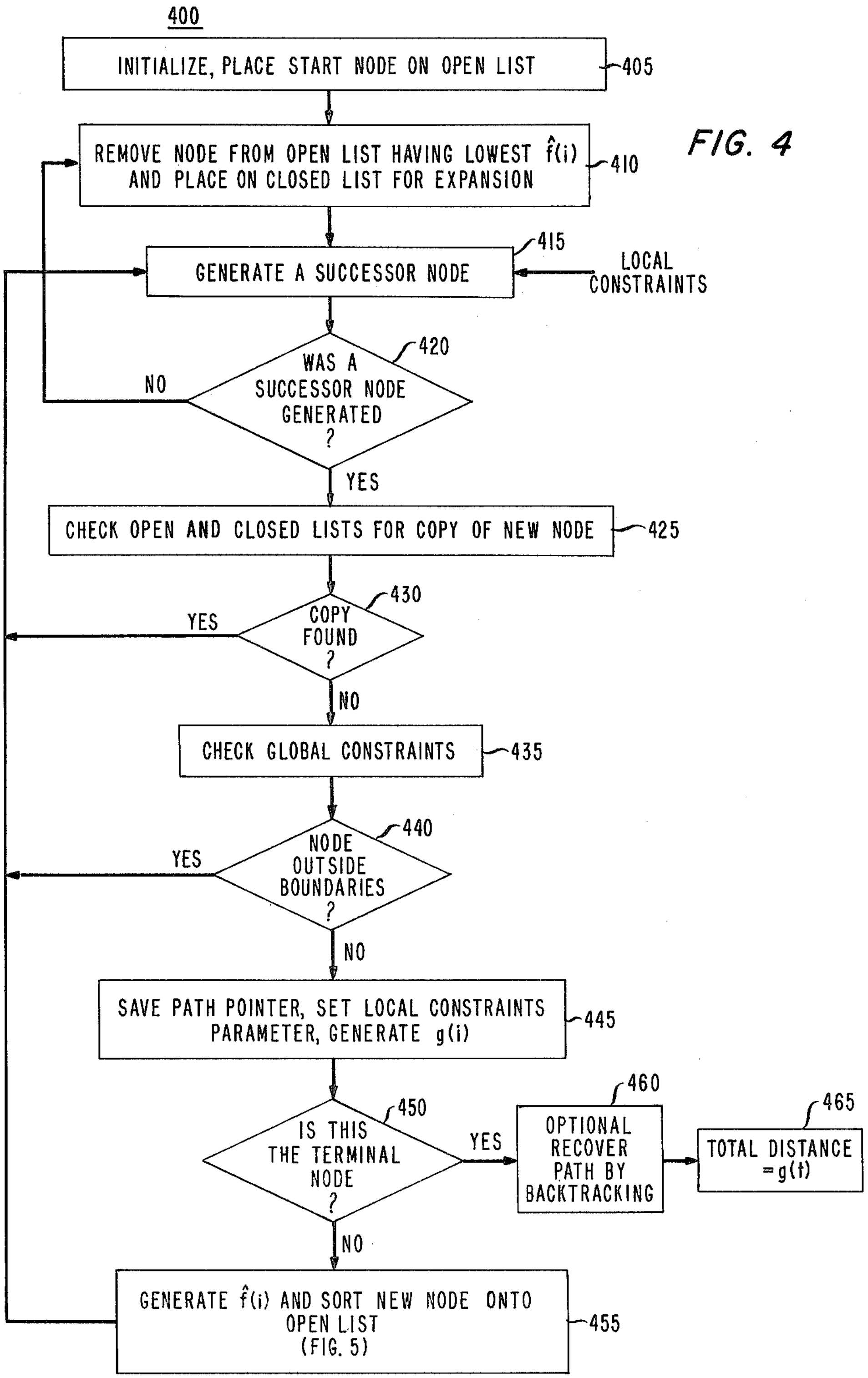
FIG. 4 shows a flow chart of the dynamic time warping operation of the circuit in FIG. 1.

The search process of the invention may be implemented by microprocessor 103. Microprocessor 103 is controlled by instruction codes stored in memory 104. The instruction codes are listed in FORTRAN language form in Appendix 1. The operations in accordance with the instruction codes may be illustrated with reference to flow chart 400 in FIG. 4 and graph 600 in FIG. 6. The open and closed lists are initialized, that is, cleared or reset (box 405). The nodal state of start node s=(1,1) is then entered at the top of the open list (box 405). The top entry from the open list is removed and placed at the top of the closed list for expansion (box 410). A successor node is generated, subject to the local constraints (box 415). In the case of start node s=(1,1), nodes (2,1), (2,2) and (2,3) are the three legal successors. In graph 600 generally, permitted successor nodes are joined by a line to their predecessor or parent node.

If a successor node is generated (box 420), the open and closed lists are checked to see if the node appears on either list (box 425). If the node appears on the closed list, it need not be added to the open list since an optimal path to this node was already found. Furthermore, if the successor node already appears on the open list it need not be added again since the path by which this node was previously generated is optimal to the expanded node and must be of lower distance than the path currently under consideration, or else it would not have been expanded previously (box 430).

The successor node is next checked against the global constraints (box 435). If the node is within the boundaries of the window (box 440), a pointer to the parent node is saved, a local constraints parameter is set and the accumulated local distance signal g(i) is generated (box 445). The local constraints parameter is required according to equation (13) so that the path is forced to rise by 1 every other node.

If the successor node is not the terminal node t (box 450), the predicted total distance $\hat{f}(i)$ is generated. Based on signal $\hat{f}(i)$, the nodal state of the successor node is sorted onto the open list (box 455). Another successor node is selected (box 415) and processed (boxes 420–455) until all the legal successor nodes have been generated and their corresponding nodal states sorted onto the open list. When no additional successor nodes can be generated (box 420), the successor node having the lowest $\hat{f}(i)$ is selected as the new parent node (box 410). The parent node is expanded as above.

The process repeats (boxes 410–455) until a successor node is identified as the terminal node t (box 450). The global distance $D_\nu$ is equal to g(t), that is, the accomulated distance at node t (box 465). The process of comparing one input word and one reference word is thereby finished.

In FIG. 6, the search process begins at node s=(1,1). Of the possible successor nodes (2,1), (2,2) and (2,3); node (2,1) has the lowest predicted total distance $\hat{f}(i)$ and is therefore selected for expansion. In graph 600, numerals designate (in order) the nodes selected for expansion; node (2,1) is labeled node 1.

Recalling that the path is constrained to rise by 1 every other frame, node 1 has two possible successor nodes: nodes (3,2) and (3,3). Node (3,3), labeled node 2, has the lowest $\hat{f}(i)$ and is therefore expanded. This process continues until node 17 is expanded. The possible successors to node 17, nodes (19,19) and (19,20) are both found to have a larger predicted total distance $\hat{f}(i)$ than node (8,7). Node (8,7) therefore becomes node 18 and is expanded.

The possible successor nodes (9,8) and (9,9), are shown connected by dotted lines to parent node 18 in graph 600. Node (9,9) is eliminated from further consideration since it was previously encountered when node 7 was expanded. Node (9,8), on the other hand, is found to have a greater predicted total distance $\hat{f}(i)$ than node (19,19). Node (19,19) therefore becomes node 19 and is expanded. Node 19 is next expanded to node 20 and finally node t is reached with a minimal total distance.

The savings in the number of local distance signals $\hat{d}$ that must be generated (in this example where N=21 frames) over a conventional dynamic programming process is approximately the ratio of the unconnected nodes to connected nodes in graph (600), or about 2 to 1. The savings have been found experimentally to be even better—about 3 to 1—in a more usual case where N=42 frames.

Returning now to consideration of the predictor $\hat{h}(i)$, it will be recalled that $\hat{h}(i)$ is summed together with accumulated local distance signal g(i) to give the total estimated distance $\hat{f}$. Predictor $\hat{h}(i)$ may be generated in several ways. It may be, for example, a fixed estimator of the form $$\hat{h}(i)=(N-n)\alpha \tag{16}$$

where $\alpha$ is a parameter of the estimator. This fixed form, however, may be a gross underestimate of the accumulated distance from node i to node t when the input and reference words are from different acoustic classes.

Preferably, predictor signal $\hat{h}(i)$ may be generated adaptively according to the equation:

$$\hat{h}(i) = (N - n)\alpha \frac{g(i)}{n} \tag{17}$$

The predictor of equation (17) has the advantage that for input and reference words from different acoustic classes, g(i)/n becomes large and forces $\hat{h}$ into the proper range.

Experimentation with the predictor of equation (17) showed that the resulting path distances were insensitive to $\alpha$ over a wide range. Based on this experimentation, a value of $\alpha$=0.7, for example, is suitable.

The efficiency of the path search process can be improved further by forcing $\alpha$ to become much larger than 0.7 when preliminary results indicate that the test and reference words come from different acoustic classes. This makes $\hat{h}(i)$ predominant in generating $\hat{f}(i)$ and thereby minimizes backing up during the search. Predictor $\hat{h}(i)$ may be accordingly generated as follows:

$$\begin{aligned} h(i) &= 0.7 \frac{g(i)}{n}(N-n) \text{ if } \frac{g(i)}{n} < \beta \\ &= 2.0 \frac{g(i)}{n}(N-n) \text{ if } \frac{g(i)}{n} \geqq \beta \end{aligned} \tag{18}$$

where $\beta$ is the largest reasonable average distance expected when comparing test and reference words of the same acoustic class. Values of $\beta$ between about 0.6 and 0.7, for example, are suitable.

Figure 5:
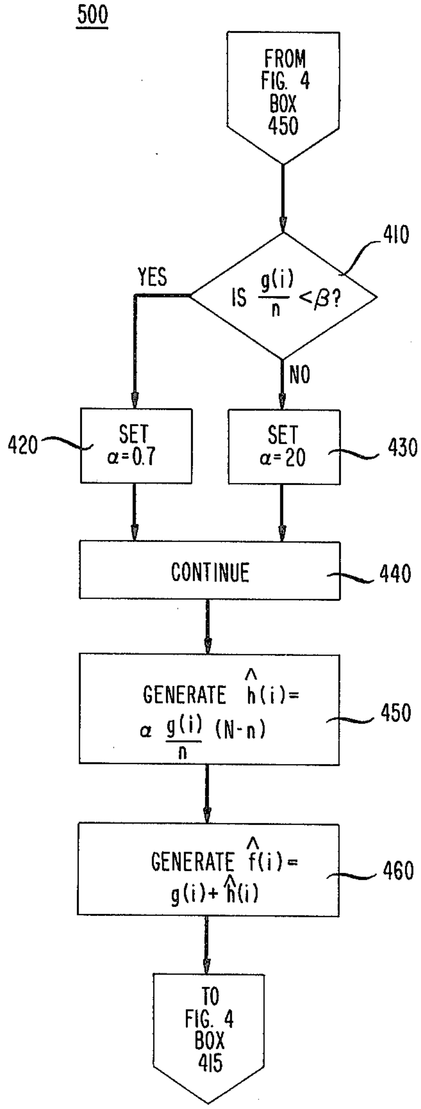
FIG. 5 shows a flow chart of predicted total distance signal generation in FIG. 4.

Referring to FIG. 5, flow chart 500 shows the generation of predictor signal $\hat{h}(i)$ and predicted total distance signal $\hat{f}(i)$. Flow chart 500 illustrates in detail the operations of box 455 in FIG. 4. If accumulated distance signal g(i) divided by the input frame index n is less than average distance $\alpha$ (box 510), the parameter $\alpha$ is set equal to 0.7 (box 520). On the other hand, if g(i)/n is greater than or equal to $\beta$, $\alpha$ is set to 2.0 (box 530). The process continues (box 540) and predictor signal $\hat{h}(i)$ is generated in accordance with equation (18) (box 550). Accumulated distance signal g(i) and predictor signal $\hat{h}(i)$ are combined to generate predicted total distance signal $\hat{f}(i)$ (box 550).

While the invention has been shown and described with reference to a preferred embodiment, various modifications and changes may be made by one skilled in the art without departing from the spirit and scope of the invention. The sequence of nodes which comprise the optimal path, for example, may be optionally recovered by backtracking through the closed list of nodal states (box 460).

APPENDIX I

```
      SUBROUTINE DSWARP(NR,T,DT,LVP,&)
      DIMENSION LVP(75),NODE(5,500),CNODE(2,500)
      INTEGER HEAD,HEAD2,EMP
      LOGICAL LSENSW
      COMMON/ECST/ECOST,NND,EMP
C*****  ROUTINE TO PERFORM DYNAMIC TIME WARP
C       USING DIRECTED SEARCH
C*****  GLOBAL CONSTRAINT FUNCTIONS
      MH(I)=MINO(2*(I-1)+1,NR-0.5*(NT-I),NR)
      ML(I)=MAXO((I-1)/2+1,NR-2*(NT-I),1)
C
C       NODE DATA STRUCTURE:
C       1. IR
C       2. IT
C       3. POINTER FORWARD (OPEN LIST)
C       4. POINTER TO PARENT NODE
C       5. LOCAL CONSTRAINT PARAMETER
C
C
C       CNODE DATA STRUCTURE:
C       1. TRUE COST, G(N)
C       2. ESTIMATED TOTAL PATH COST, F'(N)
C
C*****  CHECK FOR REALIZABLE WARP PATH
      IF(NR.GE.2*NT.OR.NT.GE.2*NR) RETURN 5
C*****  SETUP
      NND=0
      HEAD=1
      HEAD2=0
      EMP=2
      NODE(1,1)=1
      NODE(2,1)=1
      NODE(3,1)=0
      NODE(4,1)=0
      NODE(5,1)=1
      CNODE(1,1)=DIST(1,1)
C*****  EXPAND A NODE
5     NND=NND+1
      DO 31 I=NODE(5,HEAD),3
      NODE(1,EMP)=NODE(1,HEAD)+I-1
      NODE(2,EMP)=NODE(2,HEAD)+1
C*****  CHECK OPEN AND CLOSED FOR NEW NODE
      IF(EMP.LT.6) GO TO 16
      DO 15 K=5,EMP-1
      IF(NODE(1,EMP).EQ.NODE(1,K).AND.
      NODE(2,EMP).EQ.NODE(2,K))
     * GO TO 31
15    CONTINUE
C*****  CHECK GLOBAL CONSTRAINTS
16    IF(NODE(1,EMP).LT.ML(NODE(2,EMP))
     * .OR.NODE(1,EMP).GT.MH(NODE(2,EMP))) GO TO 31
C*****  SAVE PATH
      NODE(4,EMP)=HEAD
C*****  SET LOCAL CONSTRAINT PARAMETER
      IF(I.EQ.1) NODE(5,EMP)=2
      IF(I.GT.1) NODE(5,EMP)=1
C*****  GET CURRENT COST
```

-continued

APPENDIX I

```
      CNODE(1,EMP)=CNODE(1,HEAD)+DIST(NODE
      (1,EMP),NODE(2,EMP))
C*****  CHECK FOR TERMINAL NODE
      IF(NODE(2,EMP).EQ.NT) GO TO 40
C*****  ESTIMATE TOTAL PATH COST
      AVCOST=CNODE(1,EMP)/FLOAT(NODE(2,EMP))
C*****  SET ESTIMATOR DYNAMICALLY BASED ON
        TWO-CLASS DECISION
      IF(AVCOST.LT.0.6) ECFAC=0.7*ECOST*AVCOST
      IF(AVCOST.GE.0.6) ECFAC=2.0*ECOST8AVCOST
      CNODE(2,EMP)=CNODE(1,EMP)*(1.+
      ECFAC*FLOAT(NT-NODE(2,EMP)))
C*****  PUSH NODE ONTO OPEN LIST
C       CHECK FOR FIRST ENTRY
      IF(HEAD2.GT.0) GO TO 7
C*****  MAKE FIRST ENTRY
      NODE(3,EMP)=0
      HEAD2=EMP
      GO TO 30
C*****  CHECK HEAD OF OPEN LIST
7     IF(CNODE(2,EMP).GT.CNODE(2,HEAD2))
      GO TO 8
C*****  ADD NODE TO HEAD OF OPEN LIST
      NODE(3,EMP)=HEAD2
      HEAD2=EMP
      GO TO 30
C*****  CHECK REST OF OPEN LIST
8     IPT=NODE(3,HEAD2)
      IPTS=HEAD2
      DO 20 J=2,300
      IF(IPT.GT.0) GO TO 11
C*****  AT END OF LIST; ADD NODE
      NODE(3,IPTS)=EMP
      NODE(3,EMP)=0
      GO TO 30
C*****  CHECK COST LIST
11    IF(CNODE(2,EMP).GT.CNODE(2,IPT)) GO TO 13
C*****  FOUND LOCATION TO PUSH NODE
      NODE(3,EMP)=IPT
      NODE(3,IPTS)=EMP
      GO TO 30
C*****  GO TO NEXT COST IN OPEN LIST
13    IPTS=IPT
20    IPT=NODE(3,IPT)
30    EMP=EMP+1
31    CONTINUE
C*****  SETUP FOR NEXT EXPANSION
      HEAD=HEAD2
      HEAD2=NODE(3,HEAD)
      GO TO 5
C*****  RECOVER PATH
40    DT=CNODE(1,EMP)
      LVP(NT)=NR
      IPT=NODE(4,EMP)
      LVP(NT-1)=NODE(1,IPT)
      DO 50 I=3,NT
      IPT=NODE(4,IPT)
50    LVP(NT+1-I)=NODE(1,IPT)
      RETURN
      END
```

What is claimed is:

1. A method for time aligning a first speech pattern with a second speech pattern comprising the steps of:

generating a time frame sequence of signals representative of the acoustic features of the first speech pattern, generating a time frame sequence of signals representative of the acoustic features of the second speech pattern, and pairing each first speech pattern time frame with one of the second speech pattern time frames responsive to the first speech pattern feature signals and the second speech pattern feature signals, the time frame pairing comprising;

generating a series of signals representative of the succession of first speech pattern time frames, responsive to each successive first speech pattern time frame signal, performing the steps of, generating a set of signals corresponding to second speech pattern candidate time frames for the current first speech pattern time frame, generating a set of signals representative of the correspondence between the acoustic feature signals of the current first speech pattern time frame and the acoustic feature signals of the second speech pattern candidate time frames, generating a signal for each second speech pattern candidate time frame and the current first speech pattern time frame predictive of the similarity of the first and second speech patterns along a path including the second speech pattern candidate time frame and current first speech pattern time frame responsive to the correspondence signals of the preceding and current first speech pattern time frames, and selecting one of the second speech pattern candidate time frames for the current first speech pattern time frame pair responsive to the predictor signals of the current first speech pattern time frame.

2. The method of claim 1 wherein the correspondence signals are distance signals.

3. The method of claim 2 wherein each predictive signal $\hat{f}$ is generated according to $$\hat{f}(i)=g(i)+\hat{h}(i)$$

where i is the index of a node which comprises the current first speech pattern time frame and one of the second speech pattern candidate time frames, g(i) is the minimum accumulated distance of the current and predecessor nodes and h(i) is the predicted accumulated distance of successor nodes.

4. The method of claim 3 wherein the predictor signal h(i) is generated according to $$\hat{h}(i) = \alpha \frac{g(i)}{n} (N - n)$$

where $\alpha$ is a parameter of predictor $\hat{h}(i)$, n is the current first speech pattern time frame and N is the last first speech pattern time frame.

5. The method of claim 4 wherein the parameter $\alpha$ is approximtely 0.7.

6. The method of claim 4 wherein the parameter $\hat{\alpha}$ is approximately 0.7 if $$\frac{g(i)}{n} < \beta$$

and the parameter $\alpha$ is approximately 2.0 if $$\frac{g(i)}{n} \geqq \beta$$

where $\beta$ is the average distance expected between comparisons of speech patterns from the same acoustic class.

7. The method of claim 6 wherein the average distance $\beta$ is in the range of about 0.6 to 0.7.

8. The method of claim 2 wherein each first speech pattern acoustic feature signal T(n) is a linear predictive feature of the $n^{th}$ time frame of the first speech pattern, and each second speech pattern acoustic feature signal R(m) is a linear predictive feature of the $m^{th}$ time frame of the second speech pattern.

9. The method of claim 8 wherein the distance signals are generated according to $$\hat{d}(T(n),R(m))=\log(T(n)\cdot R(m))$$

where · represents the dot product.

10. Apparatus for time aligning a first speech pattern with a second speech pattern comprising:

means for generating a time frame sequence of signals representative of the acoustic features of the first speech pattern, means for generating a time frame sequence of signals representative of the acoustic features of the second speech pattern, and means responsive to the first speech pattern feature signals and the second speech pattern feature signals for pairing each first speech pattern time frame with one of the second speech pattern time frames, the time frame pairing means comprising;

means for generating a series of signals representative of the succession of first speech pattern time frames, means for generating a set of signals corresponding to second speech pattern candidate time frames for the current first speech pattern time frame, means for generating a set of signals representative of the correspondence between the acoustic features of the current first speech pattern time frame and the acoustic feature signals of the second speech pattern candidate time frames, means responsive to the correspondence signals of the preceding and current first speech pattern time frames for generating a signal for each second speech pattern candidate time frame and the current first speech pattern time frame predictive of the similarity of the first and second speech patterns along a path including the second speech pattern candidate time frame and current first speech pattern time frame, and means responsive to the predictor signals of the current first speech pattern time frame for selecting one of the second speech pattern candidate time frames for the current first speech pattern time frame pair.

11. The apparatus of claim 10 wherein the correspondence signals are distance signals.

12. The apparatus of claim 11 wherein each predictive signal $\hat{f}$ is generated according to $$\hat{f}(i)=g(i)+\hat{h}(i)$$

where i is the index of a node which comprises the current first speech pattern time frame and one of the second speech pattern candidate time frames. g(i) is the minimum accumulated distance of the current and predecessor nodes and $\hat{h}(i)$ is the predicted accumulated distance of successor nodes.

13. The apparatus of claim 12 wherein the predictor signal $\hat{h}(i)$ is generated according to $$\hat{h}(i) = \alpha \frac{g(i)}{n} (N - n)$$

where $\alpha$ is a parameter of predictor $\hat{h}(i)$, n is the current first speech pattern time frame and N is the last first speech pattern time frame.

14. The method of claim 13 wherein the parameter $\alpha$ is approximately 0.7.

15. The apparatus of claim 13 wherein the parameter $\alpha$ is approximately 0.7 if $$\frac{g(i)}{n} < \beta$$

and the parameter $\alpha$ is approximately 2.0 if $$\frac{g(i)}{n} \geqq \beta$$

where $\beta$ is the average distance expected between comparisons of speech patterns from the same acoustic class.

16. The apparatus of claim 15 wherein the average distance $\beta$ is in the range of about 0.6 and 0.7.

17. The apparatus of claim 10 wherein each first speech pattern acoustic feature signal T(n) is a linear predictive feature of the $n^{th}$ time frame of the first speech pattern, and each second speech pattern acoustic feature signal R(m) is a linear predictive feature of the $m^{th}$ time frame of the second speech pattern.

18. The apparatus of claim 17 wherein the distance signals are generated according to $$\hat{d}(T(n), R(m))) = \log (T(n) \cdot R(m)))$$

where · represents the dot product.

19. A method for recognizing an input speech pattern as one of a set of reference speech patterns comprising the steps of:

comparing each reference speech pattern with the input speech pattern, each comparison comprising the steps of;

generating a time frame sequence of signals representative of the acoustic features of the input speech pattern, storing a time frame sequence of signals representative of the acoustic features of the current reference speech pattern, pairing each input speech pattern time frame with one of the current reference speech pattern time frames responsive to the input speech pattern feature signals and the current reference speech pattern time frame signals, and generating a signal representative of the correspondence between the input speech pattern and the current reference speech pattern responsive to the time frame pairs, the time frame pairing comprising;

generating a series of signals representative of the succession of input speech pattern time frames, responsive to each successive input speech pattern time frame signal, performing the steps of, generating a set of signals corresponding to reference speech pattern candidate time frames for the current input speech pattern time frame, generating a set of signals representative of the correspondence between the acoustic feature signals of the current input speech pattern time frame and the acoustic feature signals of the reference speech pattern candidate time frames, generating a signal for each reference speech pattern candidate time frame and the current input speech pattern time frame predictive of the similarity of the input and reference speech patterns along a path including the reference speech pattern candidate time frame and current input speech pattern time frame responsive to the correspondence signals of the preceding and current input speech pattern time frames, and selecting one of the reference speech pattern candidate time frames for the current input speech pattern time frame pair responsive to the predictor signals of the current input speech pattern time frame.

20. The method of claim 19 wherein the reference speech patterns are spoken words.

21. Apparatus for recognizing an input speech pattern as one of a set of reference speech patterns comprising:

means for comparing each reference speech pattern with the input speech pattern, the comparing means comprising;

means for generating a time frame sequence of signals representative of the acoustic features of the input speech pattern, means for storing a time frame sequence of signals representative of the acoustic features of the current reference speech pattern, means for pairing each input speech pattern time frame with one of the current reference speech pattern time frames responsive to the input speech pattern feature signals and the current reference speech pattern time frame signals, and means for generating a signal representative of the correspondence between the input speech pattern and the current reference speech pattern responsive to the time frame pairs, the time frame pairing means comprising;

means for generating a series of signals representative of the succession of input speech pattern time frames, means for generating a set of signals corresponding to reference speech pattern candidate time frames for the current input speech pattern time frame, means for generating a set of signals representative of the correspondence between the acoustic features of the current input speech pattern time frame and the acoustic feature signals of the reference speech pattern candidate time frames, means responsive to the correspondence signals of the preceding and current input speech pattern time frames for generating a signal for each reference speech pattern candidate time frame and the current input speech pattern time frame predictive of the similarity of the input and reference speech patterns along a path including the reference speech pattern candidate time frame and current input speech pattern time frame, and means responsive to the predictor signals of the current input speech pattern time frame for selecting one of the reference speech pattern candidate time frames for the current input speech pattern time frame pair.

22. The apparatus of claim 21 wherein reference speech patterns are spoken words.

* * * * *